(12) United States Patent
Reitter et al.

(10) Patent No.: US 12,479,450 B2
(45) Date of Patent: Nov. 25, 2025

(54) METHOD FOR OPERATING A HAND-GUIDED PROCESSING DEVICE AND PROCESSING SYSTEM

(71) Applicant: Andreas Stihl AG & Co. KG, Waiblingen (DE)

(72) Inventors: Michael Reitter, Woergl (AT); Domenik Fuchs, Kirchbichl (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 765 days.

(21) Appl. No.: 17/854,073

(22) Filed: Jun. 30, 2022

(65) Prior Publication Data
US 2023/0001941 A1 Jan. 5, 2023

(30) Foreign Application Priority Data
Jul. 1, 2021 (EP) .................................. 21183107

(51) Int. Cl.
*B60W 50/12* (2012.01)
*G01D 5/16* (2006.01)
*G01D 5/24* (2006.01)

(52) U.S. Cl.
CPC ............... *B60W 50/12* (2013.01); *G01D 5/16* (2013.01); *G01D 5/24* (2013.01)

(58) Field of Classification Search
CPC ...... B60W 50/00; B60W 50/08; B60W 50/12; G01D 5/00; G01D 5/12; G01D 5/14; G01D 5/16; G01D 5/24; G01D 18/00; G01R 27/00; G01R 27/02; G01R 27/26; G01R 27/2605; A01G 3/00; A01G 3/02; A01G 3/033; A01G 3/037; A01G 3/04; A01G 3/047; A01G 3/053; A01G 3/06;
(Continued)

(56) References Cited

U.S. PATENT DOCUMENTS

2006/0273806 A1 12/2006 Kirchner et al.
2009/0079444 A1 3/2009 Khapochkin et al.
(Continued)

FOREIGN PATENT DOCUMENTS

DE 10 2019 220 568 A1 6/2021
EP 3 031 314 A1 6/2016
(Continued)

OTHER PUBLICATIONS

German-language Search Report issued in European Application No. 21183107.8 dated Dec. 14, 2021 with partial English translation (11 pages).
(Continued)

*Primary Examiner* — Hoai-An D. Nguyen
(74) *Attorney, Agent, or Firm* — Crowell & Moring LLP (57) ABSTRACT

A method operates a hand-guided processing device having a user-activated operating sensor device with a plurality of different detection positions. The method involves the steps: a) detecting a sequence of activations of the operating sensor device at different detection positions of the plurality of detection positions, and b) when the detected sequence corresponds to a given sequence, calibrating the operating sensor device for at least one detection position of the plurality of detection positions based on at least one of the activations of the detected activations.

16 Claims, 5 Drawing Sheets

(58) Field of Classification Search
CPC .......... A01G 3/062; A01G 3/067; A01G 3/08; A01G 20/00; A01G 3/085; A01G 20/30; A01D 34/00; A01D 34/835; A01D 34/90; A01D 2034/907; B25F 5/00
USPC ................................ 324/600, 649, 658, 686
See application file for complete search history.

(56) References Cited

U.S. PATENT DOCUMENTS

| | | |
|---|---|---|
| 2018/0264638 A1 | 9/2018 | Boeck et al. |
| 2019/0377363 A1* | 12/2019 | Shelton ................ G05D 1/0293 |
| 2022/0388081 A1* | 12/2022 | Larsén ................ B23D 59/001 |

FOREIGN PATENT DOCUMENTS

| | | |
|---|---|---|
| EP | 3 120 684 A1 | 1/2017 |
| SE | 543 699 C2 | 6/2021 |
| WO | WO 2005/078333 A2 | 8/2005 |
| WO | WO 2009/018354 A1 | 2/2009 |

OTHER PUBLICATIONS

Cover page of EP 2 174 419 A1 published Apr. 14, 2010 (one (1) page).
Cover page of EP 1 716 360 A2 published Nov. 2, 2006 (one (1) page).

\* cited by examiner

METHOD FOR OPERATING A HAND-GUIDED PROCESSING DEVICE AND PROCESSING SYSTEM

CROSS REFERENCE TO RELATED APPLICATION

This application claims priority under 35 U.S.C. § 119 from European Patent Application No. 21183107.8, filed Jul. 1, 2021, the entire disclosure of which is herein expressly incorporated by reference.

BACKGROUND AND SUMMARY

The invention relates to a method for operating a hand-guided processing device and a processing system comprising a hand-guided processing device.

The invention is based on the problem of providing a method for operating a hand-guided processing device and a processing system comprising a hand-guided processing device which have improved properties.

The method according to the invention is intended and designed for operating a hand-guided processing device. The processing device comprises a user-activated operating sensor device. The operating sensor device defines or comprises a plurality of detection positions, especially spatially separated ones. The method involves the steps: a) detecting a sequence of activations of the operating sensor device at different detection positions of the plurality of detection positions. b) if the detected sequence corresponds to a given sequence, especially if it is equal to it, calibrating the operating sensor device for at least one detection position of the plurality of detection positions based on at least one of the activations of the detected activations.

This enables a triggering of the calibrating of the operating sensor device by an activating of the operating sensor device itself. This enables a synergistic effect. In other words: the activating of a separate user-activated device need not be necessary for triggering the calibrating of the operating sensor device.

In particular, the method can be automatic and/or used for the automatic operation of the processing device.

The term "self-acting" can be used synonymously with the term "automatic".

The processing device can be a garden, forest, construction and/or ground processing device. In addition or alternatively, the hand-guided processing device can be ground-supported and/or hand-carried. Further in addition or alternatively, hand-guided and especially hand-carried processing device can mean that the processing device can have a maximum weight of 100 kg (kilograms), especially 50 kg, especially 20 kg. Further in addition or alternatively, the processing device can be electrical.

The operating sensor device can be electrical.

The term "activating positions" can be used synonymously for the term "detection positions". In addition or alternatively, the term "zone" can be used synonymously for the term "position".

The detection can be automatic. In addition or alternatively, the detection can be a detecting of at least one value of at least one of the activations. Further in addition or alternatively, a threshold value need not be necessary for the detection.

The activations can be by a user or operator of the processing device.

The sequence can be a time sequence. In addition or alternatively, the sequence of activations can be called a gesture, especially a sweeping and/or swiping gesture.

The term "predetermined" or the term "predefined" can be used synonymously for the term "given".

The given sequence can comprise or define activations, especially values of the activations, of the operating sensor device at different detection positions of the plurality of detection positions. In addition or alternatively, the given sequence can be dictated at the factory and/or not be dictated by the user.

The method, especially step b), may involve: comparing the detected sequence and the given sequence with each other.

If the detected sequence does not correspond to the given sequence, the operating sensor device need not or cannot be calibrated.

The calibrating can be automatic. In addition or alternatively, the calibrating can be the calibrating of at least one value of the operating sensor device. Further in addition or alternatively, the calibrating can be based on at least one of the activations of the activations previously detected in step a) or prior to this.

The operating sensor device may be uncalibrated prior to the calibrating.

Step b) may be performed after step a) in time. In addition or alternatively, the method and especially steps a) and b) can be repeated or performed once again, in particular multiple times.

In one modification of the invention, the processing device is a lawnmower, a scarifier, a grass shears, a gyro-shears, a brush cutter, a hedge trimmer, a hedge cutter, a wood cutter, a saw, especially a chainsaw, a separating grinder, a high-branch delimber, a pruning shears, a leaf blower, a blower, a suction device, a leaf vacuum cleaner, a chopper, a sweeper, a sweeper roller, a sweeping brush, a high-pressure cleaner or a cleaning device. In addition or alternatively, the processing device comprises a processing tool. The processing tool comprises a cord, especially a cutting cord, a knife, especially a cutting knife, a cutting blade, a saw blade, a saw chain, a grinding chain, a grinding disc, a razor wheel, a flow impeller or a fluid. In particular, the processing tool is a cord, especially a cutting cord, a knife, especially a cutting knife, a cutting blade, a saw blade, a saw chain, a grinding chain, a grinding disc, a razor wheel, a flow impeller or a fluid. The calibrating is especially advantageous for such a processing device and/or such a processing tool. In particular, the processing tool can be movable.

In one modification of the invention, the operating sensor device is designed as a capacitive and/or resistive operating sensor device. The calibrating is especially advantageous for such an operating sensor device, especially under at least one external environmental influence, such as a fluctuating temperature and/or a fluctuating humidity, and/or in the case of an activation by at least one moist, especially sweaty, or dry hand and/or at least one hand wearing a glove, especially a wet or dry glove. In other words: the calibrating can be based on a capacitive input value of the user. In addition or alternatively, this allows for the elimination of moving operator parts, such as an operating lever, an operating button, an operating switch, and/or at least one operating cable pull. In particular, the one capacitive and/or resistive operating sensor device can be touch-sensitive. In addition or alternatively the activations can comprise or in particular be touch contacts.

In one modification of the invention, the calibrating involves the establishing of at least one activation threshold value, especially for controlling the processing device. This allows a control of the processing device adapted to an external environmental influence, such as a temperature and/or a humidity, and/or an activation by at least one moist, especially sweaty, or dry hand and/or at least one hand wearing a glove, especially a wet or dry glove. In particular, the establishing can be automatic. In addition or alternatively, the activation threshold value can be an activation threshold value, especially of an activation, of the operating sensor device. Further in addition or alternatively, the term "control threshold value" can be used synonymously for the term "activation threshold value".

In one modification of the invention, the processing device comprises a processing system, especially one having a movable processing tool, especially the processing tool, and/or a riding system. The method includes the step: controlling the processing system, in particular variable setting of a speed of movement and/or a rotary speed of the processing tool, and/or the riding system, especially variable setting of a riding speed as a function of at least one activation of the calibrated operating sensor device. This, especially the calibrating, enables a precise control, especially upon reaching and/or exceeding at least the established activation threshold value. In particular, the processing system, especially the processing tool, can be designed to process a surface, especially a green surface. In addition or alternatively, the riding system can be designed to move the processing device on a, especially the, surface, especially the green surface. Further in addition or alternatively, the processing system and/or the riding system can be electrical and/or controllable. Further in addition or alternatively, the control can be automatic. Further in addition or alternatively, the setting can be the setting of a value of the speed of movement and/or the rotary speed and/or a value of the riding speed. Further in addition or alternatively, the phrase "in dependence" can be used synonymously with the phrase "as a function of". Further in addition or alternatively, at least the activation can be by the user.

In one modification of the invention, the processing device comprises a processing system, especially the processing system, especially one having a movable processing tool, especially the processing tool, and/or a riding system, especially the riding system. The method includes the step: if especially at least the detected sequence corresponds to the given sequence, enabling the processing system, especially a processing drive system of the processing system, especially for the moving of the processing tool, and/or the riding system, especially a riding drive system of the riding system. This allows avoidance of an unintentional enabling of the processing system and/or the riding system. In addition or alternatively, this and especially the enabling and the control by means of the operating sensor device allows a synergistic effect or the handling of multiple functions by the operating sensor device. In particular, the processing system and especially the processing tool can be designed to process a surface, especially a green surface. In addition or alternatively, the riding system can be designed to move the processing device on a, especially the, surface, especially the green surface. Further in addition or alternatively, the processing system, especially the processing drive system, and/or the riding system, especially the riding drive system, can be electrical and/or able to be enabled. Further in addition or alternatively, the enabling can be automatic. Further in addition or alternatively, the term "switching on", "activating", "starting" or "releasing" can be used synonymously for the term "enabling". Further in addition or alternatively, the enabling can be an enabling of the operation of the processing system and/or the riding system. Further in addition or alternatively, the processing system and/or the riding system may be blocked prior to the enabling.

In one embodiment of the invention, the method includes the step: if especially at least no activation of the operating sensor device is detected, especially no longer detected, especially if a given non-activation period has elapsed since then, blocking the processing system and/or the riding system. This allows a control for the presence and/or absence of the user's hand on the operating sensor device, especially the removal of at least the hand from the operating sensor device, or the reaching of a dead man's switch. In particular, the term "monitoring" or "recognition" can be used synonymously with the term "control". In addition or alternatively, the phrase "later in time" can be used synonymously for the term "since". Further in addition or alternatively, a given value of the non-activation period can have elapsed. Further in addition or alternatively, the given non-activation period can be dictated at the factory and/or not be dictated by the user. Further in addition or alternatively, the processing system, especially the processing drive system, and/or the riding system, especially the riding drive system, can be blockable. Further in addition or alternatively, the blocking can be automatic. Further in addition or alternatively, the term "switching off", "deactivation", or "halting" can be used synonymously for the term "blocking". Further in addition or alternatively, the blocking can be a blocking of the operation of the processing system and/or the riding system. Further in addition or alternatively, the processing system and/or the riding system can have been enabled prior to the blocking.

In one modification of the invention, the method includes especially the step a): detecting a sequence duration for at least a portion of the sequence of activations. The given sequence has for at least a portion of the activations a minimum sequence duration and/or a longer maximum sequence duration, especially as compared to the minimum sequence duration. This enables a control of the intention of the detected sequence of activations, in particular, by the user. In particular, the detection can be automatic. In addition or alternatively, the detection can be a detection of a value of the sequence duration. Further in addition or alternatively, at least the portion of the sequence of activations can mean at least 50% (percent) of the sequence of activations and/or be characteristic of at least one action, especially an independent action, especially of the user. Further in addition or alternatively, the given sequence can comprise, for at least the portion of the activations, a value of the minimum sequence duration and/or a larger value of the maximum sequence duration, especially as compared to the value of the minimum sequence duration.

In one modification of the invention, the given sequence is characteristic of two actions of a, in particular the, user of the processing device, which are independent of each other and especially totally different from each other. In particular the given sequence defines or involves simultaneous activations of the operating sensor device at in particular at least two detection positions of the plurality of detection positions. The two detection positions are so distant from each other that the operating sensor device cannot be operated at the same time by the hand, especially only a single hand in particular, of the user in the two detection positions. This enables a control of the intention of the detected sequence of activations, in particular, by the user. In particular, this enables a control of the presence of both hands of the user on the operating sensor device, and/or an avoidance of the presence of one of the hands, e.g., at the processing tool when so enabled. In particular, the term "separately" can be used synonymously for the term "independently". In addition or alternatively, the term "movement" can be used synonymously for the term "action". Further in addition or alternatively, the two detection positions can be separated from each other by twice the hand breadth of the average adult's hand, e.g., at least 5 cm (centimeters), especially at least 7.5 cm, and/or at most 150 cm, especially at most 100 cm.

In one modification of the invention, the operating sensor device comprises a plurality of user-activated, especially capacitive and/or resistive operating sensors. The operating sensors define or comprise the detection positions. Step a) involves: detecting the sequence involving activations of different operating sensors of the plurality of operating sensors. Step b) involves: if the detected sequence corresponds to the given sequence, calibrating at least one operating sensor of the plurality of operating sensors. In particular, the operating sensors can be electrical. In addition or alternatively, the operating sensors can be spatially distributed, in particular arranged. Further in addition or alternatively, the given sequence can comprise or define activations of different operating sensors of the plurality of operating sensors. Further in addition or alternatively, the calibrating can be a calibrating of at least one value of at least the operating sensor. Further in addition or alternatively, at least the operating sensor can be uncalibrated prior to the time of the calibrating.

In one modification of the invention, the processing device comprises a handle, especially a guide bar. The operating sensor device extends along the handle. In particular, the detection positions are along, in particular arranged along, the handle. In particular, the term "grip" can be used synonymously for the term "handle". In addition or alternatively, the term "steerer" can be used synonymously for the term "guide bar". Further in addition or alternatively, the operating sensor device can be arranged, in particular secured, on the handle.

In one modification of the invention, step b) involves: calibrating the operating sensor device for at least one detection position of the plurality of detection positions, wherein no activation of the operating sensor device is detected, in particular has been detected, at the detection position, especially in step a), by means of interpolation. This enables a calibrating of the operating sensor device for all detection positions. In particular, as at least one support point for the interpolation at least one detection position can be used, at which at least one activation of the operating sensor device is detected, in particular has been detected, especially a mean and/or average value.

In one modification of the invention, the processing device comprises a further user-activated operating sensor device, especially one of a different kind, especially a force sensor device. In particular, the operating sensor device and the further operating sensor device are so close together, in particular arranged, in particular integrated in each other, that the operating sensor device and the further operating sensor device can be activated at the same time by the hand of the user. The method includes the step: if the detected sequence corresponds to the given sequence, especially if it is equal to it, enabling a calibrating of the further operating sensor device. This makes it possible to trigger the enabling of the calibrating of the further operating sensor device by an activating of the operating sensor device. This enables a synergistic effect. In particular, the further operating sensor device can be electrical. In addition or alternatively, the operating sensor device and the further operating sensor device can be at least partially, especially entirely, on or above each other, or in particular arranged in this way. Further in addition or alternatively, the enabling can be automatic. Further in addition or alternatively, the calibrating can be a calibrating of at least one value of the further operating sensor device. Further in addition or alternatively, the further operating sensor device can be uncalibrated before the time of the enabling and/or calibrating. Further in addition or alternatively, the method can include: in particular, either controlling of the processing system as a function of at least one activation of the calibrated operating sensor device and controlling of the riding system as a function of at least one activation of the calibrated further operating sensor device, or controlling of the processing system as a function of at least one activation of the calibrated further operating sensor device and controlling of the riding system as a function of at least one activation of the calibrated operating sensor device.

The processing system according to the invention comprises a hand-guided processing device, especially the hand-guided processing device. The processing device comprises a user-activated operating sensor device, especially the user-activated operating sensor device. The operating sensor device comprises a plurality of in particular the different detection positions, especially the plurality of in particular the different detection positions. The processing system, especially the processing device, is designed to detect a sequence, especially the sequence, of in particular the activations of the operating sensor device at in particular the different detection positions of the plurality of detection positions. Furthermore, the processing system, especially the processing device is designed, if the detected sequence corresponds to a given sequence, especially the given sequence, to calibrate the operating sensor device for at least one, especially the detection position of the plurality of detection positions based on at least one of the activations, especially the activations of the detected activations. The processing system makes possible the benefit(s) as mentioned above for the method. In particular, the processing system, especially the processing device, can be designed to carry out a method, especially the method as mentioned above. In addition or alternatively, the processing device can be designed at least partially, especially entirely as for the method as mentioned above. Further, in addition or alternatively, the processing system can be electrical.

Further benefits and aspects of the invention will emerge from the claims and the description of exemplary embodiments of the invention, which are explained in the following with the aid of the figures.

DETAILED DESCRIPTION OF THE DRAWINGS

Figure 1:
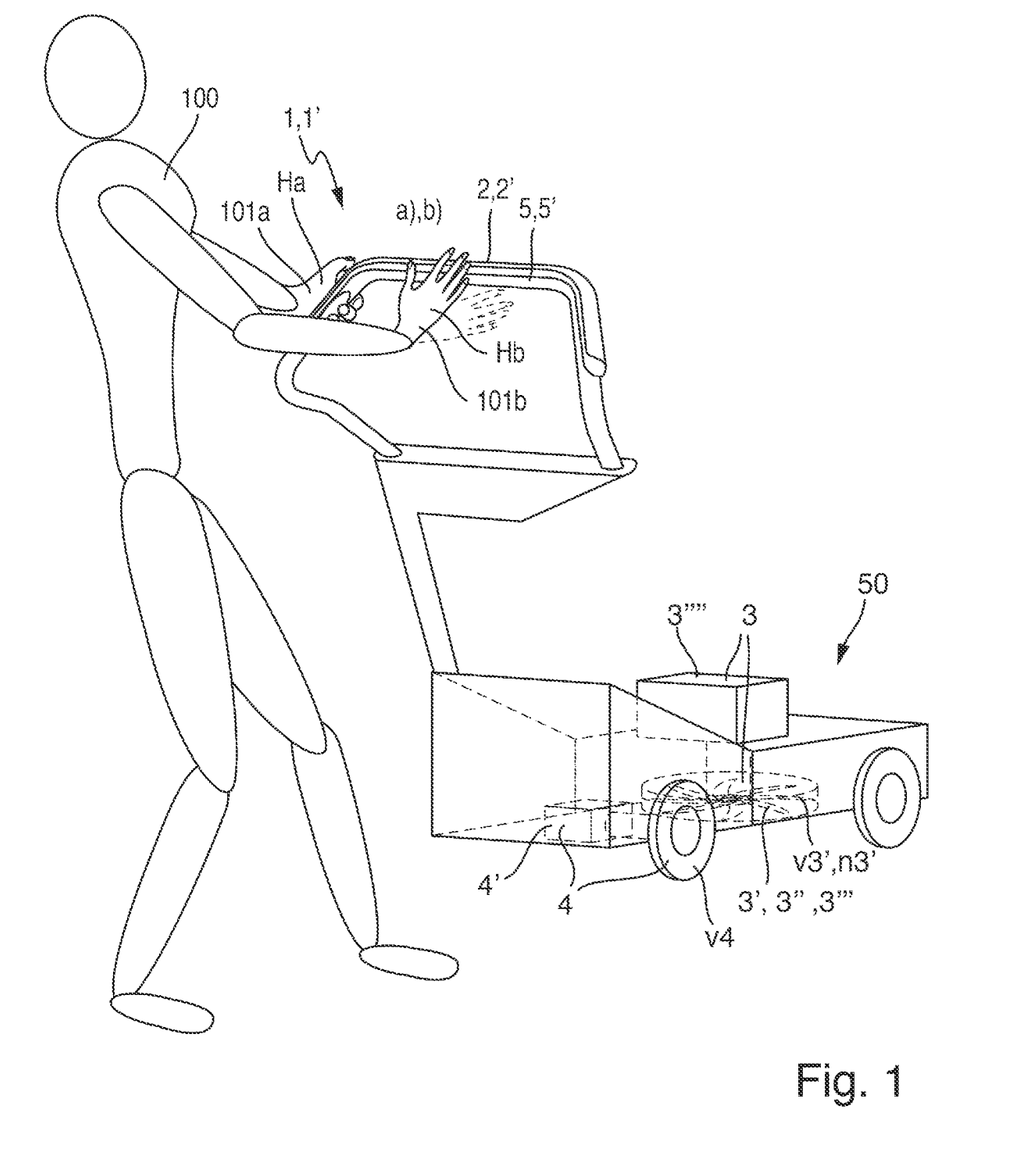
FIG. 1 is a perspective view of a processing system according to an embodiment of the invention, comprising a hand-guided processing device and a method for the operation of the hand-guided processing device.

FIG. 1 shows a processing system 50. The processing system 50 comprises a hand-guided processing device 1.

FIGS. 1 and 3 to 5 show a method for operating the hand-guided processing device 1.

Figure 2:
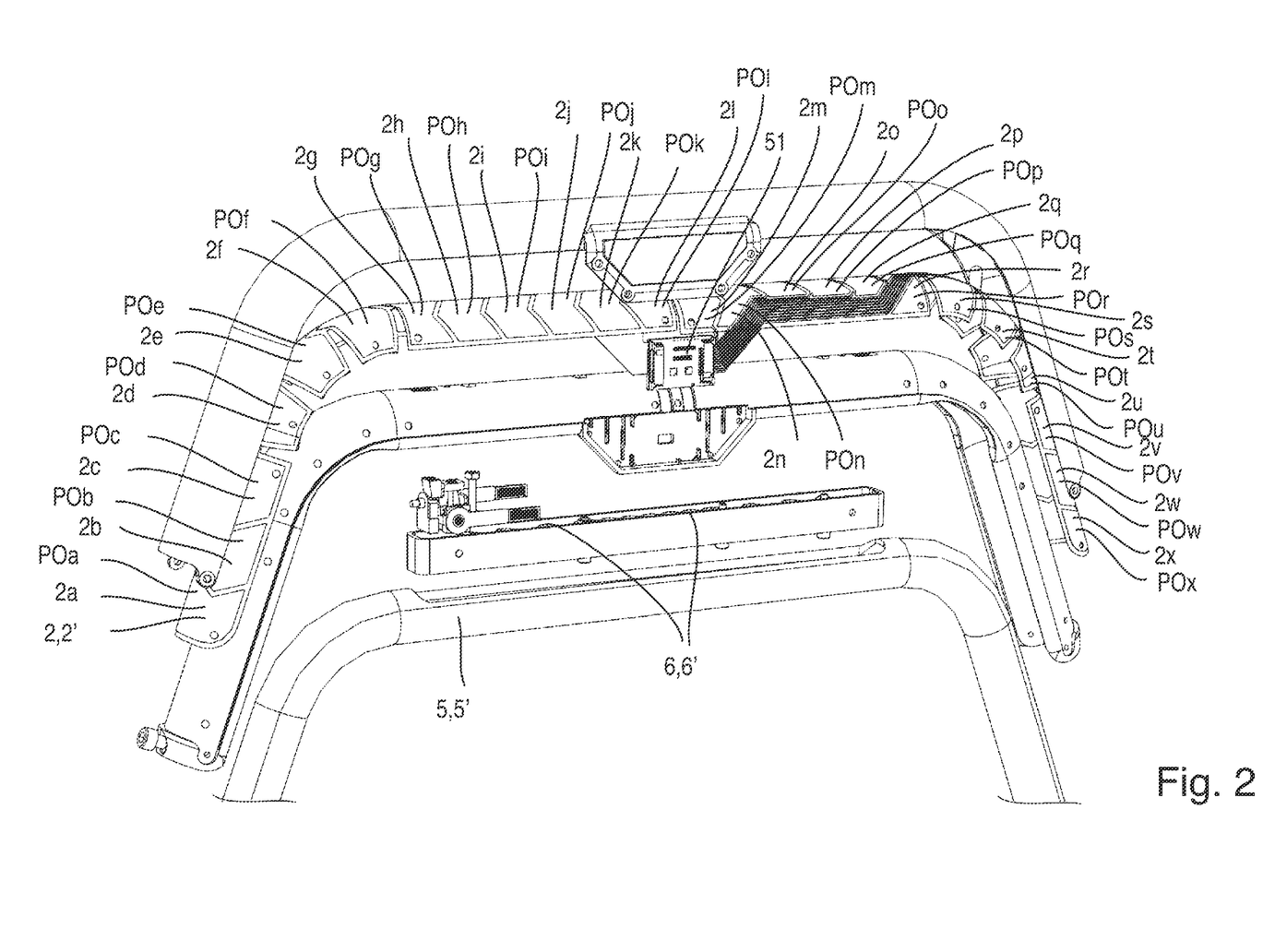
FIG. 2 is an exploded view of a user-activated operating sensor device, a further user-activated operating sensor device, and a handle of the processing device of FIG. 1.
Figure 5:
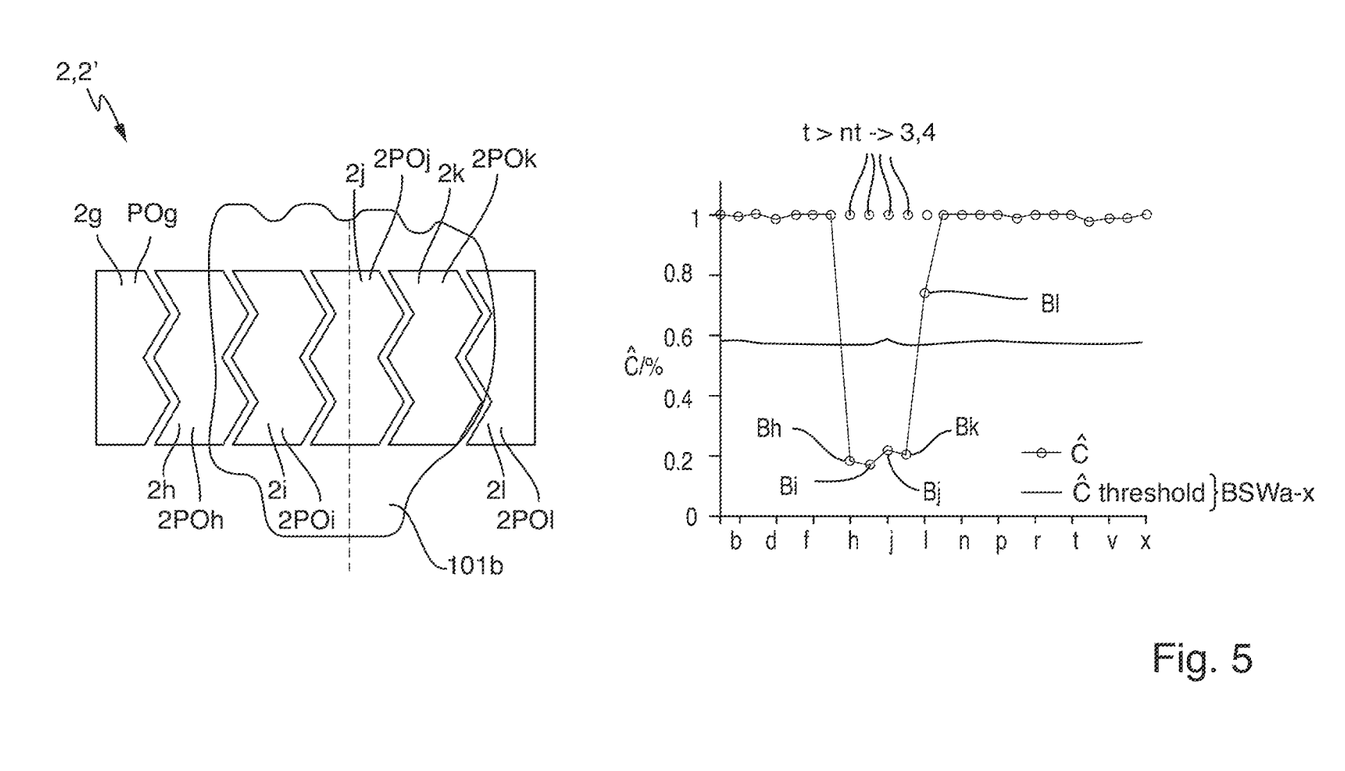
FIG. 5 illustrates a controlling of the processing device of FIG. 1 as a function of at least one activation of the calibrated operating sensor device of FIG. 2 of the method of FIG. 1.

The processing device 1 comprises a user-activated operating sensor device 2, as shown in FIGS. 1, 2 and 5. The operating sensor device 2 has a plurality of different detection positions POa-x.

Figure 4:
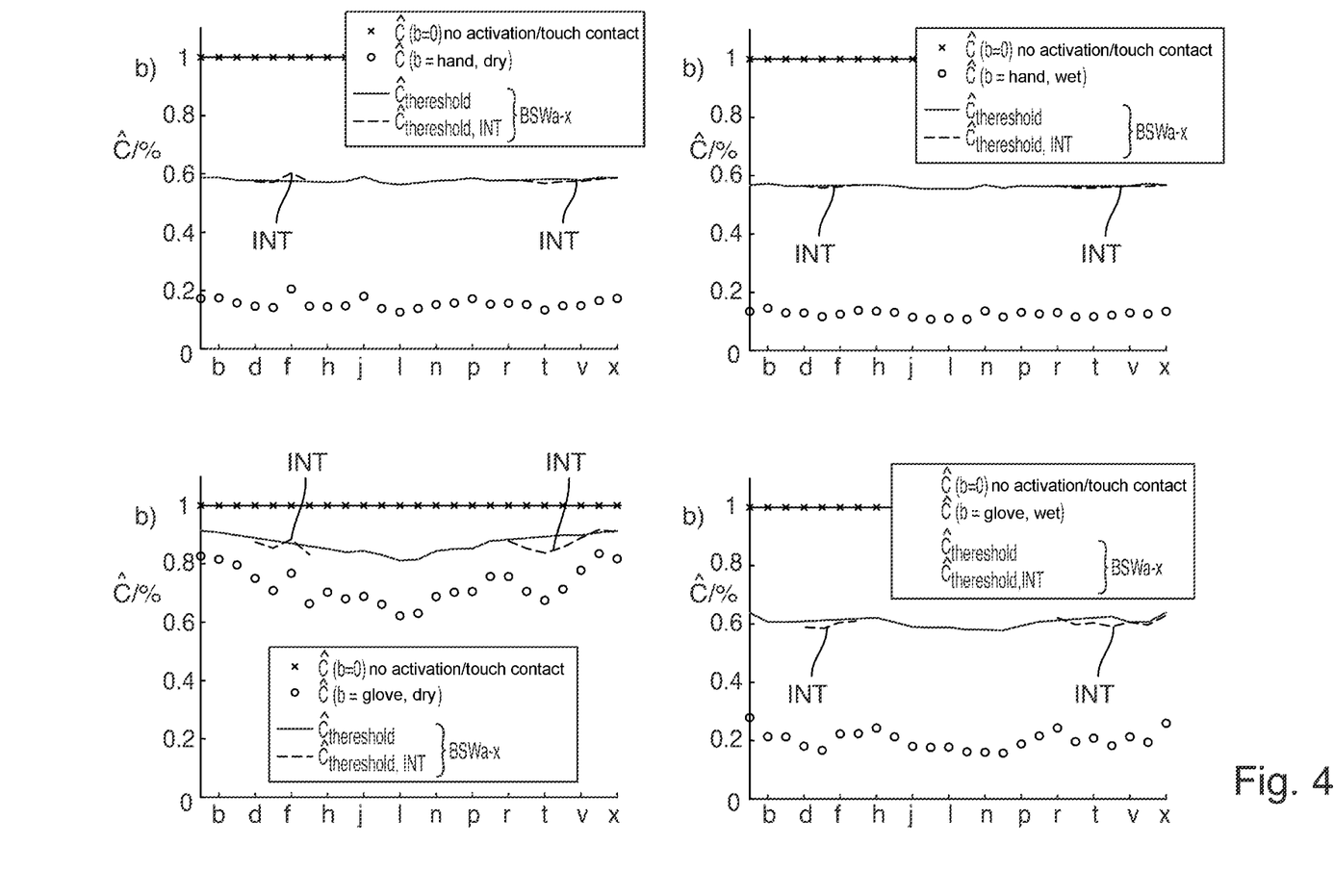
FIG. 4 illustrates a calibrating of the operating sensor device of FIG. 2 of the method of FIG. 1.

The processing system 50 is designed, in particular realized, to detect a sequence eAB of activations Ba-c, Bg-q of the operating sensor device 2, especially by a user 100 of the processing device 1, at different detection positions POa-c, Pog-q of the plurality of detection positions POa-x. Furthermore, the processing system 50 is designed, if the detected sequence eAB corresponds to a given sequence vAB, to calibrate the operating sensor device 2 for at least one detection position POa-x of the plurality of detection positions POa-x based on at least one of the activations Ba-c, Bg-q or the detected activations Ba-c, Bg-q, and is calibrated in particular, as shown in FIG. 4.

Furthermore, the method involves the steps: a) detecting the sequence eAB of the activations Ba-c, Bg-q of the operating sensor device 2 at the different detection positions POa-c, Pog-q of the plurality of detection positions POa-x, especially by means of the processing system 50; b) if the detected sequence eAB corresponds to the given sequence vAB, calibrating the operating sensor device 2 for at least the detection position POa-x of the plurality of detection positions POa-x based on at least the activations Ba-c, Bg-q of the detected activations Ba-c, Bg-q, especially by means of the processing system 50.

In detail, the operating sensor device 2 is designed as a capacitive and/or resistive operating sensor device 2', especially one having a capacitive foil.

Further, the operating sensor device 2 comprises a plurality of user-activated, especially capacitive and/or resistive operating sensors 2a-x. The operating sensors 2a-x comprise the detection positions POa-x. Step a) involves: detecting the sequence eAB comprising activations Ba-c, Bg-q of different operating sensors 2a-c, 2g-q of the plurality of operating sensors 2a-x. Step b) involves: if the detected sequence eAB corresponds to the given sequence vAB, calibrating at least one operating sensor 2a-x of the plurality of operating sensors 2a-x.

In the exemplary embodiment shown, the operating sensor device 2 comprises twenty four detection positions POa-x and/or twenty four or a corresponding, especially an equal plural number of operating sensors 2a-x. In alternative exemplary embodiments, the operating sensor device can have at least two detection positions and/or at least two or a corresponding, especially an equal plural number of operating sensors.

Furthermore, in the exemplary embodiment shown the processing device 1 is a lawnmower 1', especially an electrical or battery-powered lawnmower, as shown in FIG. 1. In alternative exemplary embodiments, the processing device can be a scarifier, a grass shears, a gyro-shears, a brush cutter, a hedge trimmer, a hedge cutter, a wood cutter, a saw, a separating grinder, a high-branch delimber, a pruning shears, a leaf blower, a blower, a suction device, a leaf vacuum cleaner, a chopper, a sweeper, a sweeper roller, a sweeping brush, a high-pressure cleaner or a cleaning device.

In addition, in the exemplary embodiment shown the processing device 1 comprises a processing tool 3'. In the exemplary embodiment shown, the processing tool 3' comprises a knife 3", especially a cutting knife 3'''. In alternative exemplary embodiments, in addition or alternatively the processing tool can comprise a cord, especially a cutting cord, a cutting blade, a saw blade, a saw chain, a grinding chain, a grinding disc, a razor wheel, a flow impeller or a fluid.

Furthermore, in the exemplary embodiment shown the calibrating involves the establishing of at least one activation threshold value BSWa-x, especially for controlling the processing device 1, as shown in FIGS. 4 and 5.

This enables a controlling of the processing device 1 adapted to an activation by means of at least one dry hand, as shown in FIG. 4, upper left, by means of at least one wet hand, as shown in FIG. 4, upper right, by means of at least one hand wearing a dry glove, as shown in FIG. 4, lower left, and/or by means of at least one hand wearing a wet glove, as shown in FIG. 4, lower right.

In particular, FIG. 4 shows capacitances without activation/touch contact, especially having a value of one, the percentage decreases in the capacitances upon activation/touch contact, and at least the established activation threshold value BSWa-x.

Furthermore, the processing device 1 comprises a processing system 3, especially one having the movable processing tool 3', and/or a riding system 4, as shown in FIG. 1.

In addition, the method involves the step: controlling the processing system 3, in particular variable setting of a speed of movement and/or a rotary speed v3', n3' of the processing tool 3', and/or the riding system 4, especially variable setting of a riding speed v4 as a function of at least one activation Bh-k, especially reaching and/or exceeding at least the established activation threshold value BSWa-x, of the calibrated operating sensor device 2, especially by means of the processing system 50, as shown in FIG. 5.

In particular, at least the activation Bh-k is by means of at least one hand 101b of the user 100.

Further in addition, the method involves the step: if the detected sequence eAB corresponds to the given sequence vAB, enabling the processing system 3, especially a processing drive system 3'''' of the processing system 3, especially for the moving of the processing tool 3', and/or the riding system 4, especially a riding drive system 4' of the riding system 4, especially by means of the processing system 50, as shown in FIG. 1.

In particular, the processing drive system and/or the riding drive system 4' in particular each comprise a drive motor and/or a coupling/brake mechanism, especially one interposed in between.

In addition or alternatively, the riding system 4 comprises at least one wheel, especially a driven wheel, in particular two wheels, especially and at least one wheel, especially a nondriven wheel, especially two wheels.

Furthermore, the method includes the step: if no activation of the operating sensor device 2 is detected, especially if a given non-activation period nt has elapsed since then, blocking the processing system 3 and/or the riding system 4, especially by means of the processing system 50, as shown in FIG. 5.

In particular, this means especially what is shown in FIG. 4, that in the event of the enabling and in particular the controlling of the processing system 3 and/or the riding system 4 by means of at least one hand wearing a wet glove, upon drying no activation of the operating sensor device 2 is detected and thus the processing system 3 and/or the riding system 4 is/are blocked. A new calibration must then be done, in particular, with enabling and controlling.

Figure 3:
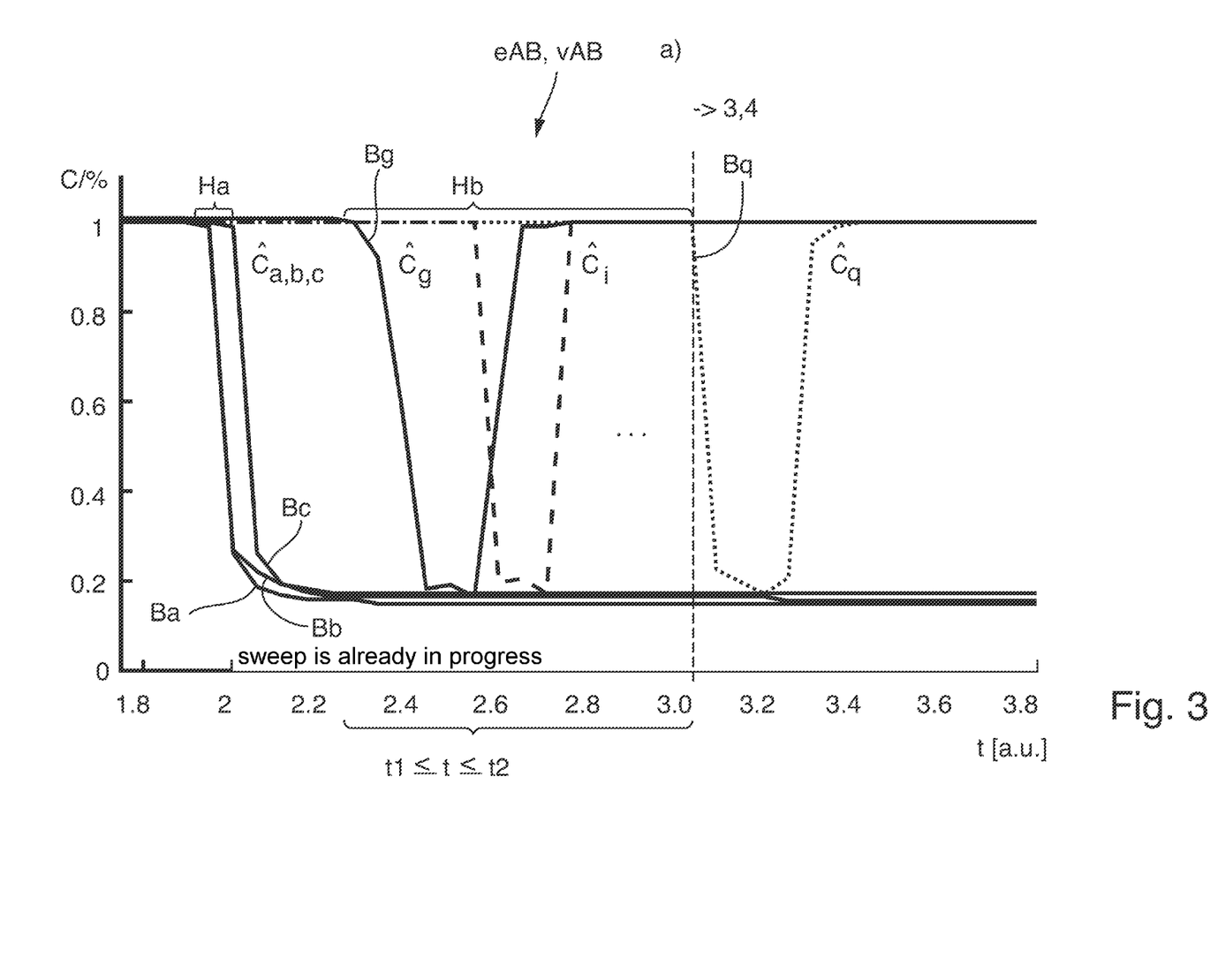
FIG. 3 illustrates a detecting of a sequence of activations of the operating sensor device of FIG. 2 of the method of FIG. 1.

Furthermore, the method includes especially the step a): detecting a sequence duration t for at least a portion Bg-q of the sequence eAB of activations Ba-c, Bg-q, especially by means of the processing system 50, as shown in FIG. 3. The given sequence vAB has for at least a portion Bg-q of the activations Ba-c, Bg-q a minimum sequence duration t1, such as 100 ms (milliseconds), especially 200 ms, and/or a longer maximum sequence duration t2, such as 1600 ms, especially 800 ms, especially as compared to the minimum sequence duration t1.

Furthermore, the given sequence vAB is characteristic of two actions Ha, Hb of the user 100 of the processing device 1, which are independent of each other and especially totally different from each other, as shown in FIGS. 1 and 3. In particular the given sequence vAB involves simultaneous activations Ba-c, Bg-q of the operating sensor device 2 at two detection positions POa-c, POg-q of the plurality of detection positions POa-x. The two detection positions POa-c, POg-q are so distant from each other that the operating sensor device 2 cannot be operated at the same time by one hand 101a, 101b of the user 100 in the two detection positions POa-c, POg-q.

In the exemplary embodiment shown, the action Ha is the activation Ba-c of the operating sensor device 2 at least at the detection position POa-c, in particular, the one hand 101a of the user 100, especially the left hand, must remain at least at the detection position POa-c. The action Hb is the activation Bg-q of the operating sensor device 2 at least at the detection position POg-q, in particular, the one hand 101b of the user 100, especially the right hand, must sweep along the detection positions POg-q.

Further, the portion Bg-q of the sequence eAB of activations Ba-c, Bg-q is characteristic of the activation Bg-q of the operating sensor device 2 at least at the detection position POg-q and/or for the action Hb, especially the sweeping with the hand 101b, especially the right hand, along the detection positions POg-q.

In particular, at the start all capacitance values are at 1. First of all, the operating sensor device 2 is activated at least at the detection position POa-c. Thus, a break occurs for at least the capacitance value at least at the detection position POa-c. After this, the system waits until the sweep occurs along the detection positions POg-q. As there is a decrease in the capacitance value Cg of the detection position POg, it is clear that the sweep is in progress and the detection of the sequence duration t for at least the portion Bg-q of the sequence eAB of activations Ba-c, Bg-q is being performed or has been started. An index of the detection position is incremented by one. This process is repeated until such time as the last detection position POq is reached. If a capacitance break occurs at this detection position POq, the detection of the sequence duration t is ended or halted for at least the portion Bg-q of the sequence eAB of activations Ba-c, Bg-q. Thus, the sequence duration t results.

In addition or alternatively, the detection, especially of the sequence of the activations comprises a detection or a recognition of a decrease in a capacitance value.

Furthermore, the processing device 1 comprises a handle 5, especially a guide bar 5'. The operating sensor device 2 extends along the handle 5. In particular, the detection positions POa-x are along the handle 5, in particular, at a distance from each other.

Furthermore, step b) involves: calibrating the operating sensor device 2 for at least one detection position POd-f, POr-x of the plurality of detection positions POa-x, wherein no activation of the operating sensor device 2 is detected at the detection position POd-f, POr-x, by means of interpolation INT, as shown in FIG. 4, especially by means of the processing system 50.

Moreover, the processing device 1 comprises a further user-activated operating sensor device 6, especially one of a different kind, especially a force sensor device 6', especially one having a force-resistive foil, as shown in FIG. 2. In particular, the operating sensor device 2 and the further operating sensor device 6 are so close together, in particular integrated in each other, that the operating sensor device 2 and the further operating sensor device 6 can be activated at the same time by a hand, in particular the hand 101b, of the user 100. The method includes the step: if the detected sequence eAB corresponds to the given sequence vAB, enabling a calibrating of the further operating sensor device 6, especially by means of the processing system 50.

Moreover, in the exemplary embodiment shown, the processing system 50, especially the processing device 1, comprises a control device, especially a computing and/or storage device, or electronics 51, for performing the method as mentioned above, in particular, for storing the detected activations, for the calibrating and/or for storing the calibration, especially at least of the established activation threshold value BSWa-x.

In detail, the operating sensor device 2 and/or the further operating sensor device 6 and/or the electronics 51 are/is arranged on the handle 5, in particular in the handle 5, in particular integrated in its handle shell. In particular, the operating sensor device 2, especially the capacitive foil, is inserted between an upper handle shell and a lower handle shell of the handle 5. In addition or alternatively, the operating sensor device 2 is connected to the electronics 51. This, and especially the modular design with the separate design of the operating sensor device 2 and the further operating sensor device 6, especially the force sensor device 6', makes it possible to offer the further operating sensor device 6 as an optional feature. In addition or alternatively, this makes it possible in particular to recess the operating sensor device 2 and/or the further operating sensor device 6 and/or the electronics 51 in the handle 5, and to protect them against at least one external environmental influence, such as rain and/or grime.

Moreover, the detecting, especially of the sequence of the activations is possible once the processing device 1 has been awakened and/or is energized with a drive power, especially an electrical one, in particular from a battery pack, especially an electrical one.

As the exemplary embodiments shown and described above make clear, the invention provides an advantageous method for operating a hand-guided processing device and an advantageous processing system comprising a hand-guided processing device which have improved properties.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a hand-guided processing device having a user-activated operating sensor device with a plurality of different detection positions, the method comprising the steps of:
   a) detecting a sequence (eAB) of activations (Ba-c, Bg-q) of the operating sensor device at different detection positions (POa-c, Pog-q) of the plurality of detection positions (POa-x); and
   b) when the detected sequence (eAB) corresponds to a given sequence (vAB), calibrating the operating sensor device for at least one detection position (POa-x) of the plurality of detection positions (POa-x) based on at least one of the activations (Ba-c, Bg-q) of the detected activations (Ba-c, Bg-q),
   wherein the operating sensor device comprises a plurality of user-activated, capacitive and/or resistive operating sensors, wherein the operating sensors comprise the detection positions (POa-x),
   wherein step a) comprises: detecting the sequence (eAB) involving activations (Ba-c, Bg-q) of different operating sensors ($2a$-$c$, $2g$-$q$) of the plurality of operating sensors ($2a$-$x$), and
   wherein step b) comprises: when the detected sequence (eAB) corresponds to the given sequence (vAB), calibrating at least one operating sensor ($2a$-$x$) of the plurality of operating sensors ($2a$-$x$).

2. The method according to claim 1,
   wherein the processing device is a lawnmower, a scarifier, a grass shears, a gyro-shears, a brush cutter, a hedge trimmer, a hedge cutter, a wood cutter, a saw, a separating grinder, a high-branch delimber, a pruning shears, a leaf blower, a blower, a suction device, a leaf vacuum cleaner, a chopper, a sweeper, a sweeper roller, a sweeping brush, a high-pressure cleaner or a cleaning device, and/or
   wherein the processing device comprises a processing tool, wherein the processing tool comprises a cord, a knife, a cutting blade, a saw blade, a saw chain, a grinding chain, a grinding disc, a razor wheel, a flow impeller or a fluid.

3. The method according to claim 1,
   wherein the operating sensor device is designed as a capacitive and/or resistive operating sensor device.

4. The method according to claim 1,
   wherein the calibrating involves establishing at least one activation threshold value (BSWa-x) for controlling the processing device.

5. The method according to claim 1,
   wherein the processing device comprises a processing system and/or a riding system,
   wherein the method further comprises the step of:
   controlling the processing system and/or the riding system as a function of at least one activation of the calibrated operating sensor device.

6. The method according to claim 5,
   wherein the processing system has a movable processing tool,
   wherein controlling the processing system variably sets a speed of movement and/or a rotary speed of the moveable processing tool, and/or
   wherein controlling the riding system variably sets a riding speed.

7. The method according to claim 1,
   wherein the processing device comprises a processing system having a movable processing tool, and/or a riding system,
   wherein the method further comprises the step of:
   when the detected sequence (eAB) corresponds to the given sequence (vAB), enabling a processing drive system for moving the processing tool, and/or a riding drive system of the riding system.

8. The method according to claim 7, further comprising:
   when no activation of the operating sensor device is detected, blocking the processing system and/or the riding system.

9. The method according to claim 8,
   wherein the blocking occurs when a given non-activation period has elapsed following a detection of the activation of the operating sensor device.

10. The method according to claim 1,
    wherein the method includes the step a): detecting a sequence duration (t) for at least a portion (Bg-q) of the sequence (eAB) of activations (Ba-c, Bg-q); and
    wherein the given sequence (vAB) has, for at least a portion (Bg-q) of the activations (Ba-c, Bg-q), a minimum sequence duration (t1) and/or a longer maximum sequence duration (t2), as compared to the minimum sequence duration (t1).

11. The method according to claim 1,
    wherein the given sequence (vAB) is characteristic of two actions (Ha, Hb) of a user of the processing device, which are independent of each other,
    wherein the given sequence (vAB) involves simultaneous activations (Ba-c, Bg-q) of the operating sensor device (2) at two detection positions (POa-c, POg-q) of the plurality of detection positions (POa-x),
    wherein the two detection positions (POa-c, Pog-q) are at a distance from each other so that the operating sensor device cannot be operated at the same time by one hand of the user in the two detection positions (POa-c, POg-q).

12. The method according to claim 1,
    wherein the processing device comprises a further user-activated operating sensor device,
    wherein the operating sensor device and the further operating sensor device are so close together that the operating sensor device and the further operating sensor device are activatable at the same time by the hand of the user,
    wherein the method further comprises the step of:
    when the detected sequence (eAB) corresponds to the given sequence (vAB), enabling a calibrating of the further operating sensor device.

13. The method according to claim 1,
    wherein the processing device comprises a handle,
    wherein the detection positions (POa-x) extend along the handle.

14. The method according to claim 13,
    wherein the handle is a guide bar.

15. The method according to claim 1,
    wherein step b) comprises: calibrating the operating sensor device for at least one detection position (POd-f, POr-x) of the plurality of detection positions (POa-x), wherein no activation of the operating sensor device is detected at the detection position (POd-f, POr-x), by way of interpolation.

16. A processing system, comprising:
    a hand-guided processing device, wherein the processing device comprises a user-activated operating sensor device, wherein the operating sensor device comprises a plurality of different detection positions, and wherein the processing system is configured to:
   detect a sequence (eAB) of activations (Ba-c, Bg-q) of the operating sensor device at different detection positions (POa-c, Pog-q) of the plurality of detection positions (POa-x), and
   when the detected sequence (eAB) corresponds to a given sequence (vAB), calibrate the operating sensor device for at least one detection position (POa-x) of the plurality of detection positions (POa-x) based on at least one of the activations (Ba-c, Bg-q) of the detected activations (Ba-c, Bg-q),
wherein the operating sensor device comprises a plurality of user-activated, capacitive and/or resistive operating sensors, wherein the operating sensors comprise the detection positions (POa-x),
wherein the processing system is further configured to:
   detect the sequence (eAB) involving activations (Ba-c, Bg-q) of different operating sensors ($2a$-$c$, $2g$-$q$) of the plurality of operating sensors ($2a$-$x$), and
   when the detected sequence (eAB) corresponds to the given sequence (vAB) calibrate at least one operating sensor ($2a$-$x$) of the plurality of operating sensors ($2a$-$x$).

* * * * *